March 1, 1938.  C. STRECKER  2,110,098

SEALING CONSTRUCTION

Filed Sept. 5, 1936  2 Sheets-Sheet 1

INVENTOR
Charles Strecker
BY
Prindle, Bean & Mann
ATTORNEY

March 1, 1938.                C. STRECKER                2,110,098
SEALING CONSTRUCTION
Filed Sept. 5, 1936                2 Sheets-Sheet 2
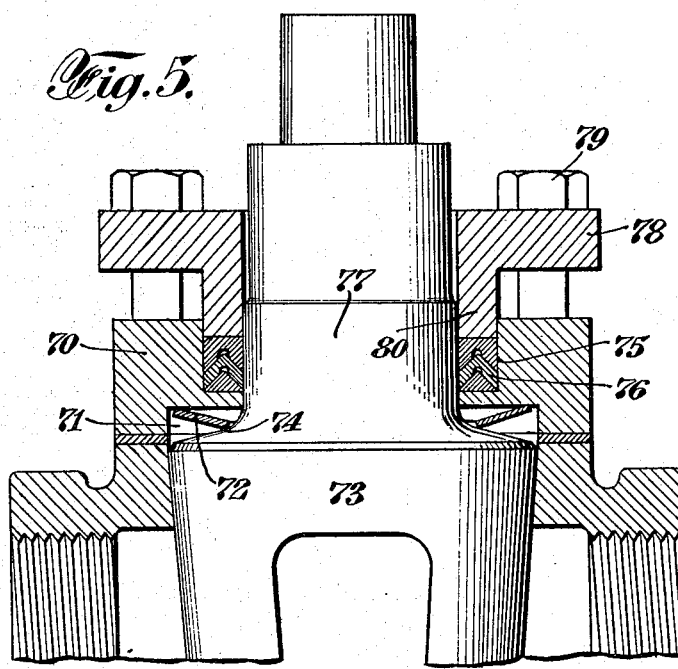
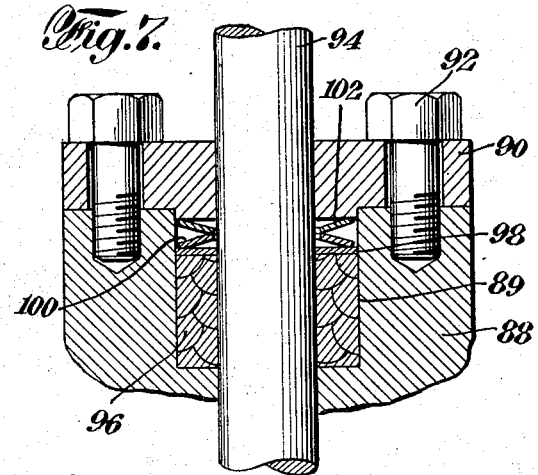
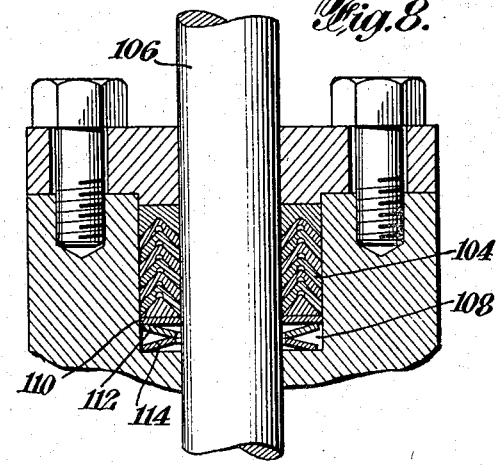
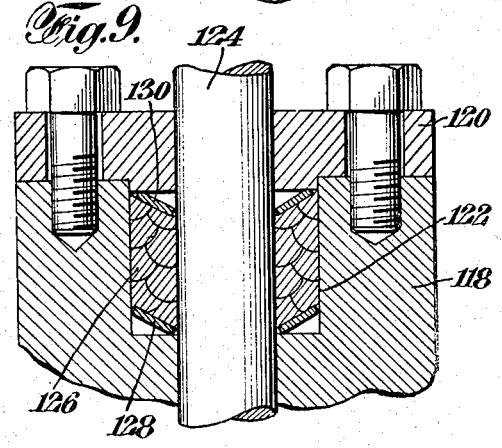
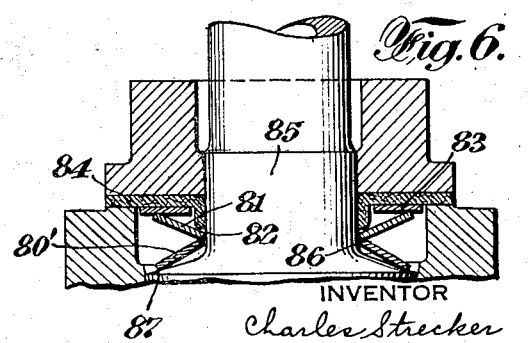
INVENTOR
Charles Strecker
BY
Prindle, Bean & Mann
ATTORNEYS Patented Mar. 1, 1938

2,110,098

UNITED STATES PATENT OFFICE 2,110,098

SEALING CONSTRUCTION

Charles Strecker, North Arlington, N. J., assignor to Eastwood-Nealley Corporation, Belleville, N. J., a corporation of New Jersey Application September 5, 1936, Serial No. 99,526

11 Claims. (Cl. 251—103)

This invention relates to sealing means adapted for use in plug valves and the like.

It is well known that, in ordinary gland-packed plug valves with packing on top of the plug, there is usually a substantial amount of gland leakage and cover leakage, and furthermore, the plug tends to seize tight in the body. It is difficult and often impossible to rotate the plug to open or closed position due to the lack of elasticiy in the packing and because the packing has been pulled up tight by the gland bolts to stop leakage around the shank of the plug. If the plugs stick and a large force is exerted to attempt to rotate the plug, the valve housing or body is damaged and sometimes broken.

My invention overcomes these and other objections of the previous plug cocks and provides resilient sealing means for the shank of the plug so that a tight seal against cover leakage is obtained, and the plug is resiliently mounted and will not stick in the body. Wear between the relatively moving parts and washers and packing is also reduced to a minimum. The resilient sealing means cuts its own seal or seat, thereby materially assisting in the prevention of leakage. Any expansion or contraction due to temperature changes is absorbed by the resilient sealing means.

To the accomplishment of the foregoing, and such other objects as may hereinafter appear, my invention consists in the construction, combination and arrangement of parts hereinafter described and then sought to be defined in the appended claims, reference being had to the accompanying drawings forming a part hereof, and which show various embodiments of my invention, it being expressly understood, however, that various changes may be made in practice within the scope of the claims without digressing from my inventive idea.

In the drawings:

Fig. 5 is a cross sectional view representing a preferred form of construction for a plug valve where a packing gland is used in combination with a dished spring washer;

Fig. 6 is a similar view representing another form of my invention where a pair of opposed dished spring washers are shown;

Fig. 7 is a cross sectional view representing another form of my invention where a rotatable shaft or member is provided with a packing resiliently held around the shaft or member by one or more dished spring washers and a flat washer;

Fig. 8 is a similar view representing another form of my invention where chevron packing is held against a rotatable member by means of a dished spring washer and a flat washer; and Fig. 9 is a similar view representing another form of my invention where packing is held against a rotatable member between opposed and spaced dished spring washers.

Figure 1:
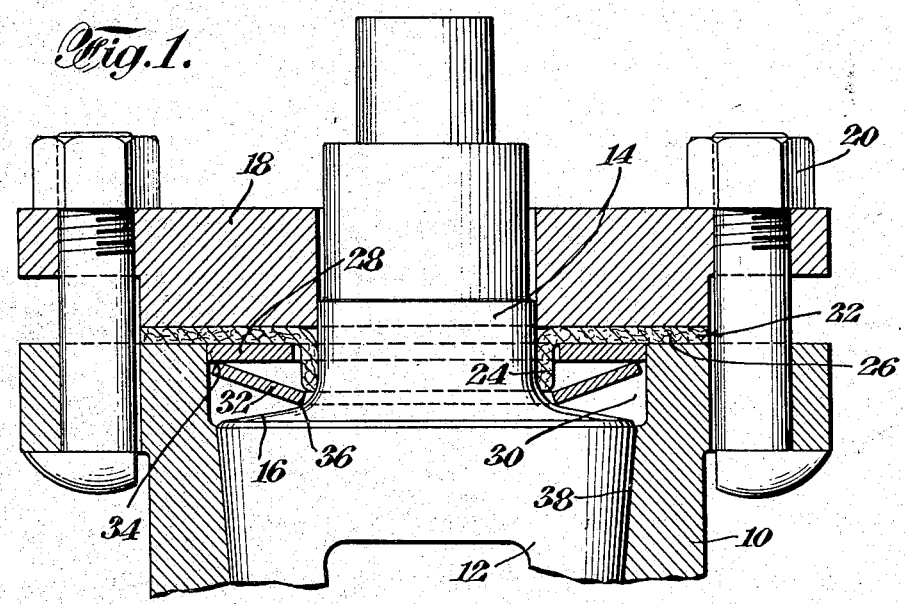
Fig. 1 represents a vertical cross section of one form of construction, showing the top portion of a plug valve provided with a dished spring washer positioned against the top of the plug and cooperating with a flat rigid washer held against packing to form a sealing joint.

I have shown different forms of my invention in the drawings. One form includes a packing held at its periphery between the bonnet of the valve and the body. A rigid washer preferably of steel, is pressed against this packing by a dished metallic spring washer which forces the steel washer against the packing, the dished washer cutting its own seal or seat in the rotatable part or parts which it engages. As this spring washer presses against the top of the plug near the shank of the plug, when the plug is rotated, it cuts a groove or grooves forming a seal or seat therein to provide a sealing construction. Instead of using only one such metallic spring washer, I may use a plurality of such spring washers and in various arrangements, where, for instance, a larger pressure is desired or where the height for the washer varies. In these arrangements I prefer to use the same size washer but I am not to be restricted thereto as different sizes may be used.

In another form of my invention I use packing material around a shank or shaft, the packing material being resiliently held in place by a steel washer and a dished metallic spring washer. In another form of my invention a dished spring washer is used at one end or both ends of packing material. Still another form of my invention includes chevron or U-section packing around a shank or shaft which is resiliently held in place by a steel washer and one or more spring dished washers.

Referring now to the drawings and first to Fig. 1, the reference character 10 designates a portion of a valve housing or body in which is rotatably mounted a plug 12 having a shank 14 and an inclined shoulder 16 between the top of the plug and the shank. A bonnet or cover plate 18 is secured to the housing or body in any suitable manner, as by bolts 20. A packing 22 is positioned between the bonnet or cover plate and the housing. This packing 22 has an inner downwardly extending annular portion 24 surrounding a portion of the shank 14. Only the outer portion 26 of the packing is held between the bonnet and the housing, the remainder of the flat part of the packing 22 being held against the bonnet by an ordinary flat rigid washer 28 which is preferably steel and fits in the annular depression or recess 30 in the housing. The opening in the washer 28 is larger than the diameter of the shank 14 so that annular portion 24 of the packing extends therethrough, and lies against the adjacent part of the shank 14.

I provide a strong dished metallic spring washer 32 which at its outer periphery at 34 presses against the under side of the washer 28 to compress the packing 22. The spring washer 32 at its inner periphery presses against the surface of the inclined shoulder 16 on the plug and when the plug is rotated to open and closed positions, this spring washer cuts its seal or seat in the plug at 36 to form a tight seal against leakage through that joint. This spring washer holds the plug in close contact with the finished tapered surface of the body as at 38 at a predetermined uniform load, preventing the plug from seizing or sticking too tightly to the body at the tapered surface and allowing the plug to be easily rotated in use to open or closed position at any time. Also any expansion or contraction due to temperature changes is absorbed by the resiliency of the spring washer.

Figure 2:
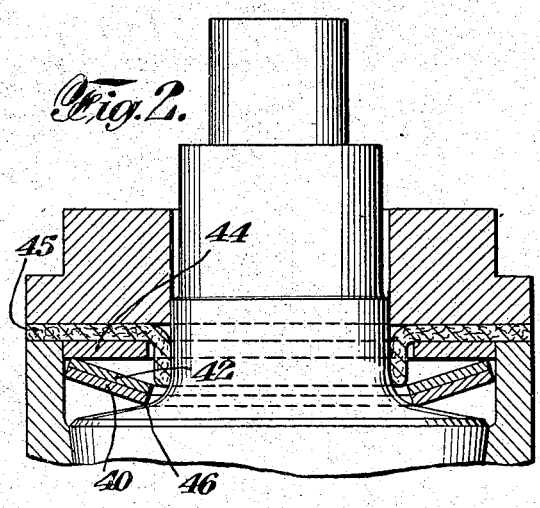
Fig. 2 is a view similar to Fig. 1, representing another form of my invention in which a plurality of nested, dished, spring washers are used.

The spring washer 32 is especially adapted where relatively large load capacity, small deflection and a limited closed height are met with in particular constructions, such as shown, for example, in Fig. 1. If larger loads are used in the valve, more than one spring washer may be used, but it will be noted that the same sized spring washers are used when more than one spring washer is found necessary. In Fig. 2 I have shown another form of my device where two nested, dished, spring washers 40 and 42 are used. The upper washer 42 presses against a flat steel washer 44 which presses against a packing ring 45, the washer being similar to the washer 28 shown in Fig. 1. The lower washer 40 has its inner periphery pressed against the top of the plug to form a resilient mounting for the plug and also to cut its seal or seat into the plug at 46 when the plug is rotated to form a tight seal against leakage.

Figure 3:
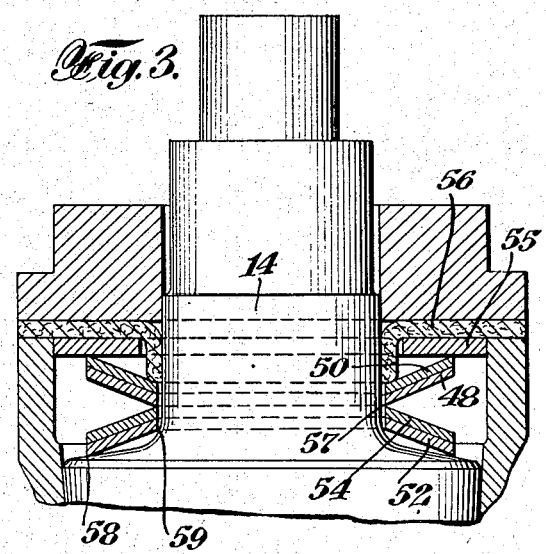
Fig. 3 is a view similar to Fig. 1, representing another form of my invention in which a plurality of sets of nested, dished, spring washers are used in opposed relation.

In Fig. 3 I have shown another form of my invention where two nested sets of opposed dished spring washers are shown, the two nested, dished spring washers 48 and 50 being positioned with the dished part facing upwardly, and the two other nested spring washers 52 and 54 being positioned with the dished part facing downwardly. The top washer is forced against flat steel washer 55 which is forced against packing ring 56. The inner washers 48 and 54 of the two sets are held in contact at their inner peripheries as at 57. The lower spring washer 52 is forced against the top of the plug at 58 and against the shank 14 at 59 and cuts its seal or seat in the plug to form a tight seal against leakage. This construction using two sets of nested washers may be used either where the height between the bonnet and top of the plug is larger than in Fig. 1 or where it is desired to exert a greater sealing pressure on the plug.

Figure 4:
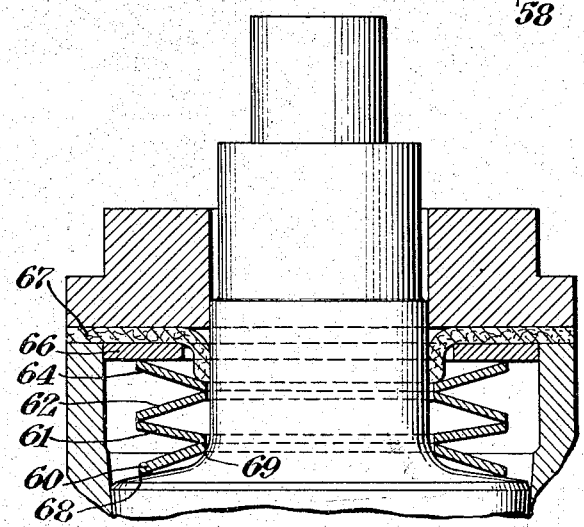
Fig. 4 is a view similar to Fig. 1, representing still another form of my invention wherein a plurality of pairs of opposed dished spring washers are used.

In Fig. 4 I have shown another arrangement in which four spring dished washers are arranged to contact only at their peripheries. The washers 60, 61, 62 and 64 are so arranged that they are not nested and with the washers adjacent each other being in opposite positions. The top washer 64 at its outer periphery is forced against steel washer 66 and packing ring 67. At its inner periphery washer 64 cooperates with the inner periphery of spring washer 62. Washers 60 and 61 are in the same relative positions as the spring washers 62 and 64 with bottom washer 60 being forced against the top of the plug at 68 and against the shank at 69 to cut in a seal or seat in the plug when the plug valve rotates to open and closed positions. By arranging the spring washers in this manner a greater distance between the bonnet and the top of the plug is accommodated. Also a greater sealing pressure may be obtained with this arrangement without the need of using different sizes of dished spring washers.

In Fig. 5 I have shown a preferred form of construction for sealing plug valves where a combination of packing material and a dished spring washer is used. In this form the bonnet or cover plate 70 is provided with an annular space or recess 71 to receive a metallic spring dished washer 72 which contacts the bonnet at its outer peripheral edge and which is pressed against the top of the plug 73 at its inner edge 74 to cut a seal or seat in the top of the plug and form a tight sealing joint. The bonnet is provided with an annular depression 75 to receive packing 76 which is shown as chevron packing in the drawings. For pressing this packing around the shank 77 of the plug, I provide a gland member 78 which is suitably secured to the bonnet or cover 70 by means of bolts 79. This gland is provided with a central annular portion 80 which fits into the annular depression 75 in the bonnet so that when the bolts 79 are tightened the packing will be forced against the shank 77 of the plug and form an additional seal. This construction prevents gland leakage, due to the fact that the edges of the metallic washer 72, cut a seal or seat and thus a leak proof joint is provided.

In Fig. 6 I have shown another form of a sealing means including two metallic spring washers 80′, 81 positioned with their inner peripheries in contact as at 82. The top spring washer is forced against flat steel washer 83 and packing ring 84. The bottom spring dished washer has its inner peripheral edge in engagement with the shank 85 of the plug and its outer peripheral edge in contact with the top of the plug. When the plug valve is rotated, the lower spring washer 80′ will cut a seal or seat in the shank of the plug at 86 and another seal or seat at 87 on the top of the plug.

In Fig. 7 I have shown another form of my invention which comprises a sealing means for a shaft or other rotatable body, such as a plug shank. In this form the supporting body 88 is provided with an annular recess or depression 89 and a cover plate or bonnet 90. The bonnet or cover plate 90 is held on the body 88 by means of bolts 92 or any other suitable connecting means. Extending through the bonnet or cover plate 90 and through the housing 88 is a shaft 94. Surrounding the shaft 94 and positioned within the recess or depression 89 is packing material 96. This packing material extends nearly up to the top of the recess 89. A flat steel washer 98, is placed on top of this packing. The steel washer 98 is pressed against the packing 96 by means of the spring dished washers 100, 102, which are similar to those described in the previous forms of my invention. The bottom washer 100 has its outer periphery in contact with the steel plate 98 and has its inner periphery in contact with and cooperating with the top spring washer 102. The outer periphery of the top spring washer 102 engages the cover plate 90. It will be seen that the spring washers are positioned in opposed relation so that the packing 96 is compressed and forms a sealing around the shaft 94.

In another form of my invention as shown in Fig. 8 the shaft housing, cover plate and cut out portion are substantially the same as described in connection with Fig. 7. However, in this form of my invention chevron or inverted U-section packing 104 is placed around the shaft 106 and the resilient washer construction is placed at the bottom of the cut out portion or groove 108. The spring construction is similar to that described in connection with Fig. 7 and includes a flat steel washer 110 forced against the bottom of the packing and opposed spring dished washers 112 and 114. By using this construction a good sealing joint is obtained around the shaft 106.

In Fig. 9 I have shown a housing 118 with a bolted cover plate 120, the housing having a recess or depression 122 to receive a packing 126 to surround a portion of the shaft 124. The packing 126 is held between the bottom spring dished washer 128 and top spring dished washer 130. The bottom dished washer presses against the bottom of the depression 122 and top dished washer 130 presses against the top plate 120.

It is seen from the foregoing description that I have provided a very simple and effective construction for preventing gland and cover leakage in valves of this character and for providing such a valve having a long life and which is always capable of proper and efficient operation. The dished metallic washer constitutes an important feature of the invention, especially in the arrangement shown as it cuts its own seat with its edge or edges, and thereby makes sealing contact with the adjacent parts so as to prevent the leakage previously referred to. In use the line pressure has a tendency to force the plug valve upwardly, but this force is opposed resiliently by the metallic spring washer construction used. The arrangement of this washer construction, together with the flexible washer construction used, provides a very efficient device.

It is to be understood that the foregoing examples are given by way of illustration and that the same may be modified in many particulars without departing from the spirit of my invention.

What I claim is:

1. A device of the character described, including a housing, a plug rotatably mounted therein, a cover secured to said housing, a spring dished washer between said cover and the top of said plug and acting to resiliently hold said plug in proper position in said housing, said spring dished washer having one edge forced against the top of said plug so as to cut a seal or seat in the top of said plug to form a tight sealing joint when said plug is rotated.

2. A device of the character described, including a housing, a plug rotatably mounted therein, a spring dished washer held between a stationary part of said housing and said plug and acting to resiliently hold said plug in proper position in said housing, said spring dished washer having one edge pressed against the top of said plug so as to cut a seal or seat therein when said plug is rotated.

3. A device of the character described, including a housing, a plug rotatably mounted therein, a spring dished washer held between a stationary part of said housing and said plug, said spring dished washer having its one edge in contact with the top of said plug and forcing said plug downwardly to resiliently hold said plug on its seat in said housing and to form a sealing joint.

4. A device of the character described, including a housing, a plug rotatably mounted therein, resilient means between a stationary part of said housing and said plug, said resilient means including a spring dished washer having its one edge in contact with the top of said plug and forcing said plug downwardly to resiliently hold said plug on its seat in said housing and to form a sealing joint.

5. A plug valve including a housing, a plug rotatably mounted therein, a cover secured to said housing, packing between said cover and said housing, a flat washer, and a spring dished washer having one peripheral edge abutting said flat washer and the other peripheral edge pressed against the shank on said plug, said spring dished washer acting to resiliently hold said plug in position.

6. A device of the character described including a housing, a plug rotatably mounted therein, a cover secured to said housing, packing material between said cover and said housing and extending into said housing, a flat washer adjacent said packing material in said housing, and a spring dished washer having one peripheral edge abutting said flat washer and forcing it against said packing material and another peripheral edge pressed against the top of said plug to resiliently hold said plug on its seat in said housing and to form a sealing joint therewith.

7. A device of the character described, including a housing, a plug rotatably mounted therein, resilient means between a stationary part of said housing and said plug, said resilient means including nested spring dished washers, the lower washer having one edge in contact with the top of said plug, said resilient means forcing said plug downwardly to resiliently hold said plug on its seat in said housing.

8. A plug valve including a housing, a plug rotatably mounted therein, a cover secured to said housing, a flat washer adjacent said cover, a spring dished washer positioned between said plug and said flat washer to force said flat washer toward said cover and said plug toward its seat, said spring washer being adapted to cut a seal or seat in the top of said plug to form a tight seal.

9. A device of the character described, including a housing, a plug rotatably mounted therein, a cover secured to said housing and provided with an annular space above said plug, a spring dished washer positioned in said annular space and between said cover and the top of said plug to hold said plug resiliently on its seat and to form a seal therewith, said cover having an annular recess to receive packing and a packing gland cooperating with said annular recess for sealing the shank of said plug.

10. A device of the character described, including a housing, a plug rotatably mounted therein and having a stem, a cover secured to said housing, packing material between said cover and said housing and extending into said housing, said packing material having a sleeve surrounding a portion of said plug stem, a washer in said housing, and a spring dished washer having one peripheral edge abutting said washer to hold said washer against said packing material and another peripheral edge pressed against the top of said plug to resiliently hold said plug on its seat in said housing and form a sealing joint therewith.

11. A device of the character described including a housing, a plug rotatably mounted therein and having a stem, a cover secured to said housing, packing material between said cover and said housing and extending into said housing, said packing material having a flat annular portion and a downwardly extending sleeve surrounding a portion of said plug stem, a washer in said housing adjacent said flat annular portion of said packing material, and a spring dished washer having one peripheral edge abutting said washer to hold said washer against the flat annular portion of said packing material and another peripheral edge pressed against the top of said plug to resiliently hold said plug on its seat in said housing.

CHARLES STRECKER.